United States Patent
Yee

(10) Patent No.: US 7,259,758 B2
(45) Date of Patent: Aug. 21, 2007

(54) SYSTEM AND METHOD FOR REDUCING LATENCY IN DISPLAY OF COMPUTER-GENERATED GRAPHICS

(75) Inventor: Dawson L. Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 10/872,941

(22) Filed: Jun. 21, 2004

(65) Prior Publication Data

US 2006/0044289 A1 Mar. 2, 2006

(51) Int. Cl.
G09G 5/00 (2006.01)
(52) U.S. Cl. .................................. 345/204; 345/215
(58) Field of Classification Search ............... 345/204, 345/212–215, 87, 88; 348/E5.018, 521
See application file for complete search history.

(56) References Cited

U.S. PATENT DOCUMENTS

| 4,992,650 A | | 2/1991 | Somerville .................. 235/462 |
| 6,219,017 B1 | * | 4/2001 | Shimada et al. ............. 345/204 |
| 6,930,663 B2 | * | 8/2005 | Sekiya et al. ................. 345/87 |
| 7,042,422 B2 | * | 5/2006 | Weitbruch et al. .......... 345/204 |

OTHER PUBLICATIONS

"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.
Bier, Stone, Pier, Buston, and DeRose. "Toolglass and Magic Lenses: The See-Through Interface." *Proceedings of Siggraph '93* (Anaheim, August). *Computer Graphics Annual Conference Series*, ACM, 1993, pp. 73-80. 8pp.
Blickenstorfer, Conrad H. "First Look: Acer TravelMate TM100 with Windows XP Tablet PC Edition." Pen Computing Magazine. Jul. 2002. pp. 44-47.

(Continued)

*Primary Examiner*—Kevin M Nguyen
(74) *Attorney, Agent, or Firm*—Workman Nydegger

(57) ABSTRACT

An interactive display system wherein a projector receives signals from a graphics source in a manner that reduces latency in images projected onto a display surface. The signals include a pixel clock signal, pixel attribute signals, and synchronization signals. The pixel clock signal is used to clock sample and hold registers at the projector to preserve the pixel attribute signals received from the graphics source. The preserved pixel attribute signals, along with position signals corresponding to the synchronization signals, are presented directly to the projector. Parameters of the projector are known, and all gain, gamma correction, and scaling are performed before the signals are provided by the graphics source. Thus, it is unnecessary to digitize, store, adjust, or otherwise process pixel attribute signals at the projector, which simplifies processing of the graphics signals and reduces latency in generating the image in response to an input on the display surface.

53 Claims, 6 Drawing Sheets

OTHER PUBLICATIONS

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew, "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augmented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar. +Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline and Ringel. "DiamondSpin: An Extensible Toolkit for Around-the-Table Interaction." *CHI 2004*, Apr. 24-29, 2004, Vienna, Austria. © 2004 ACM 1-58113-702-08/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp.).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceedings of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

SYSTEM AND METHOD FOR REDUCING LATENCY IN DISPLAY OF COMPUTER-GENERATED GRAPHICS

FIELD OF THE INVENTION

The present invention generally pertains to displays, and more specifically, to controlling latency in the presentation of computer graphics in response to graphic display signals generated by a computing system.

BACKGROUND OF THE INVENTION

Today's computer display systems are capable of generating very high quality images. By contrast, in the early 1980s, the color displays commonly available with computers offered only 320 by 200 pixel resolution, with a maximum of four colors. During the 1980s, however, increasingly better computer graphics systems became available that offered higher resolution and a much larger number of colors. However, the improved systems did present some disadvantages. Not surprisingly, high quality graphics adapters and monitors were relatively expensive. Further, early high resolution monitors were capable of working only with one type of graphics adapter.

The advent of multi-scanning monitors relieved part of this concern. Multi-scanning monitors are capable of displaying images at a variety of resolutions and include control systems that can detect the resolution generated by a graphic display source, adapt the scale of the image data received to the native resolution of the monitor, and generate a refresh clock to display an appropriate image. Thus, for example, if a multi-scanning monitor capable of generating an 800 by 600 pixel image receives image data for a 640 by 400 pixel resolution image, the multi-scanning monitor rescales the image to generate a screen-filling 800 by 600 pixel image from the 640 by 400 pixel resolution. In addition to correcting images for differences in scale, improved monitors also correct gain and gamma levels to adjust for the monitor's operational parameters.

However, the improved display capabilities of display monitors adds complexity to the display circuitry. Circuitry required to adjust the displayed image adds cost to the display. Moreover, the additional processing involved in, for example, rescaling the image, delays the image generation process. Although in many applications, a slight image generation delay does not pose a problem, in computer games, latency will likely pose a concern, because it detracts from the enjoyment and naturalness of the machine-human interaction. The latency of a system in responding to user input on the display can cause the human interaction in a virtual environment or electronic game to appear disconnected, if the delay between a user input and its effect on the virtual environment is sufficiently long to be noticeable.

Newer interactive systems that are being developed may be particularly susceptible to problems with latency, since the input is primarily through a display surface in such systems. For example, the MIT Media Lab, as reported by Brygg Ullmer and Hiroshi Ishii in "The metaDESK: Models and Prototypes for Tangible User Interfaces," *Proceedings of UIST* 10/1997:14-17," has developed a form of "keyboardless" human-machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera can detect IR reflections from the undersurface of an object placed on the graphical surface. Others have been developing similar interfaces that react to a user engaging an interactive display. For example, papers published by Jun Rekimoto of the Sony Computer Science Laboratory, Inc., and associates describe a "HoloWall" and a "HoloTable" that display images on a surface and use IR light to detect objects positioned adjacent to the surface.

In these situations where the system responds to a user's interaction with graphics presented on a display, latency results in the response of the system lagging behind a user's actions in providing an input. Clearly, the more rapidly images are generated and regenerated in response to a user's interaction, the more satisfying the user's experience will be. On the other hand, if a user moves a physical object across the interactive display, and there is a noticeable delay in the system's response to that movement, the system will be less effective and less enjoyable to use.

In such systems, detecting the user's interaction with the display may present a relatively complex computational task. Moreover, whatever response the computing system needs to substantively respond to the user's interaction may represent another computational burden. These computational tasks may take some time to perform. Thus, to reduce overall system latency, once the user's actions have been detected and the response generated, it is important that the display system not further delay the presentation of that response. Thus, it is highly desirable to be able to streamline operation of an image display system to reduce latency, particularly in interactive display systems in which it is desirable for the user to feel that the interaction is directly with a virtual environment being presented on the graphic display surface.

SUMMARY OF THE INVENTION

One of the advantages of the present invention is that it streamlines the manner in which a display control system communicates a graphic image to a display device. In a typical computing and display system, before image data generated by the computing system are displayed, the display must perform a number of steps. The image data are corrected for gamma level and gain, the signals are converted between analog and digital form, the digital data are stored in memory and reprocessed to re-scale the image to a native resolution of the display, and finally, analog signals are generated from the corrected, re-scaled data. However, in an environment where the native resolution and other operational characteristics of the display are known, gamma adjustment, gain setting, and buffering steps can be eliminated. Eliminating these steps reduces latency between image data generation and the display of the image. In addition, where the control system for the display device is disposed physically near the graphics adapter generating the image data, other advantages are available. For example, circuitry needed to detect and re-create the pixel clock signal used by the graphics adapter can be eliminated, and the pixel clock signal can be used to drive the display device. Thus, in addition to reducing latency, a number of additional devices can be eliminated, reducing complexity and cost of the display system.

One aspect of the present invention is thus directed to a system for controlling a display to present graphic image data received from a source. A pixel clock signal input receives a pixel clock signal from the source. Each of a series of pulses of the pixel clock signal indicates a transition to a next pixel in a line of the graphic image data. A pixel input receives a plurality of attribute signals from the source. The attribute signals, which may include red, green, and blue color components, represent a desired visual attribute of a pixel. Also, a synchronization input receives a plurality of synchronization signals from the source, such as horizontal and vertical synchronization signals, that signal transition to a next portion of the graphic image data. On each pulse of the pixel clock signal, a capture buffer preserves values of the attribute signals until receiving a next pulse of the pixel clock signal. A pixel output communicates the preserved attribute signals to the display device. The display device also receives the pixel clock signal. A synchronization signal output provides position signals, such as end of line and end of frame signals, to the display device.

The pixel clock signal received by the pixel clock signal input preferably includes a source pixel clock signal. Thus, the same clock signal used to generate the plurality of attribute signals from memory in the source is used to clock the display device.

Further in accordance with the present invention, when each of the plurality of attribute signals includes an analog signal, the capture buffer includes a sample and hold circuit. Alternatively, when each of the plurality of attribute signals includes a digital signal, the capture buffer includes a latch configured to preserve a maximum expected number of data bits includable in the digital signal.

Also according to an embodiment of the present invention, values of the attribute signals preserved by the capture buffer and communicated to the display maintain the same gain and/or same gamma level as the attribute signals originally received from the source. Again, when operational characteristics of the display are known to the computing system as previously described, the computing system and/or source can correct the image data for gain or gamma level, as well as scale the image as desired. Accordingly, hardware and processing to adjust such attributes can be performed by the computing system and/or source and need not be performed by the display.

The source preferably includes a video graphics array (VGA) adapter. Also, the display comprises a projector, which may be included in an interactive display system, wherein a user interacts with images projected on a display surface by the projector. By reducing display latency, the interactive system can respond more quickly and naturally to a user's interaction with the display surface.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
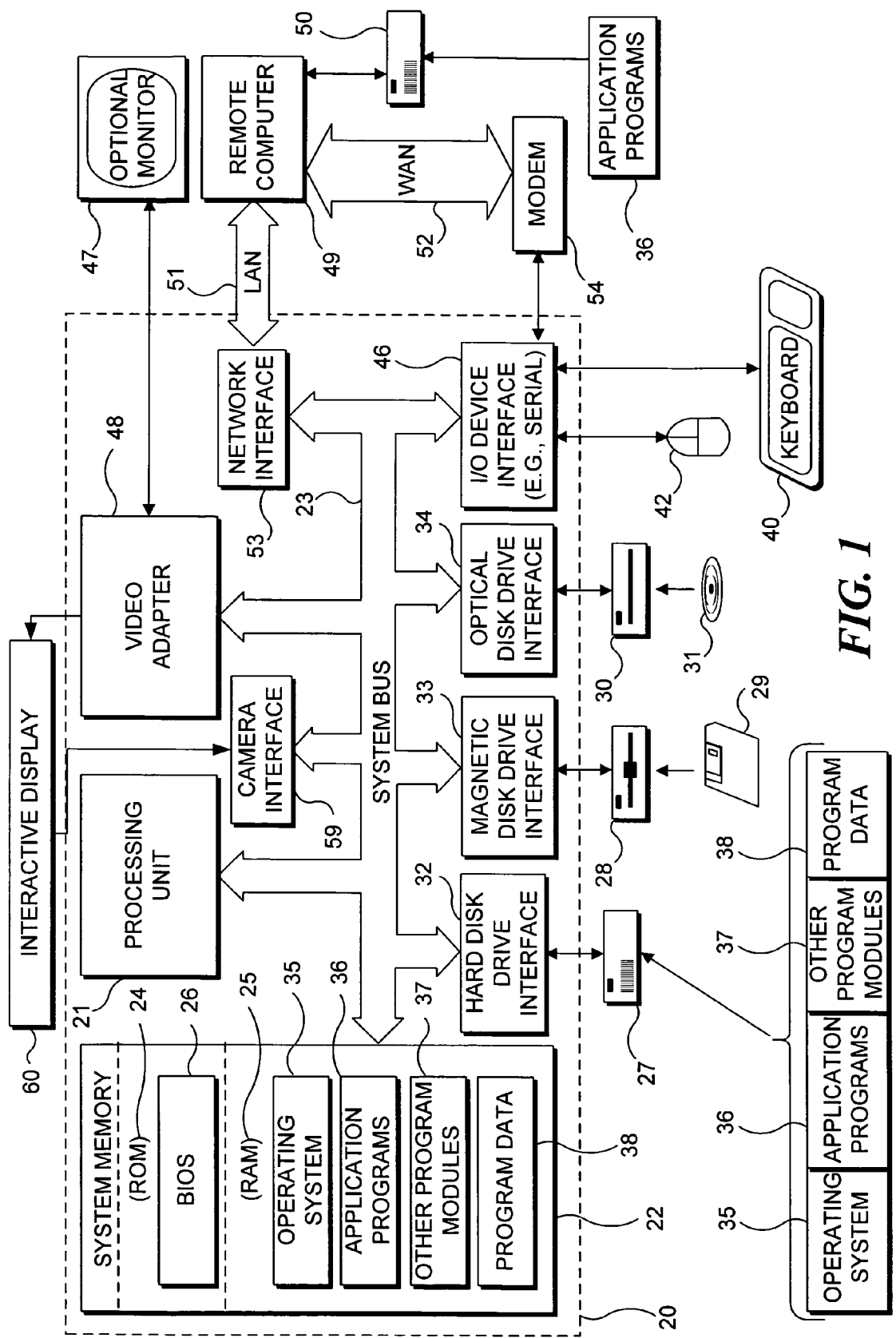
FIG. 1 is a functional block diagram of a generally conventional computing device or personal computer (PC) that is suitable for image processing for the interactive table as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video graphics adapter 48; however, the interactive display table of the present invention can provide a much richer display and interact with the user for input of information and control of software applications and is therefore preferably coupled to the video graphics adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
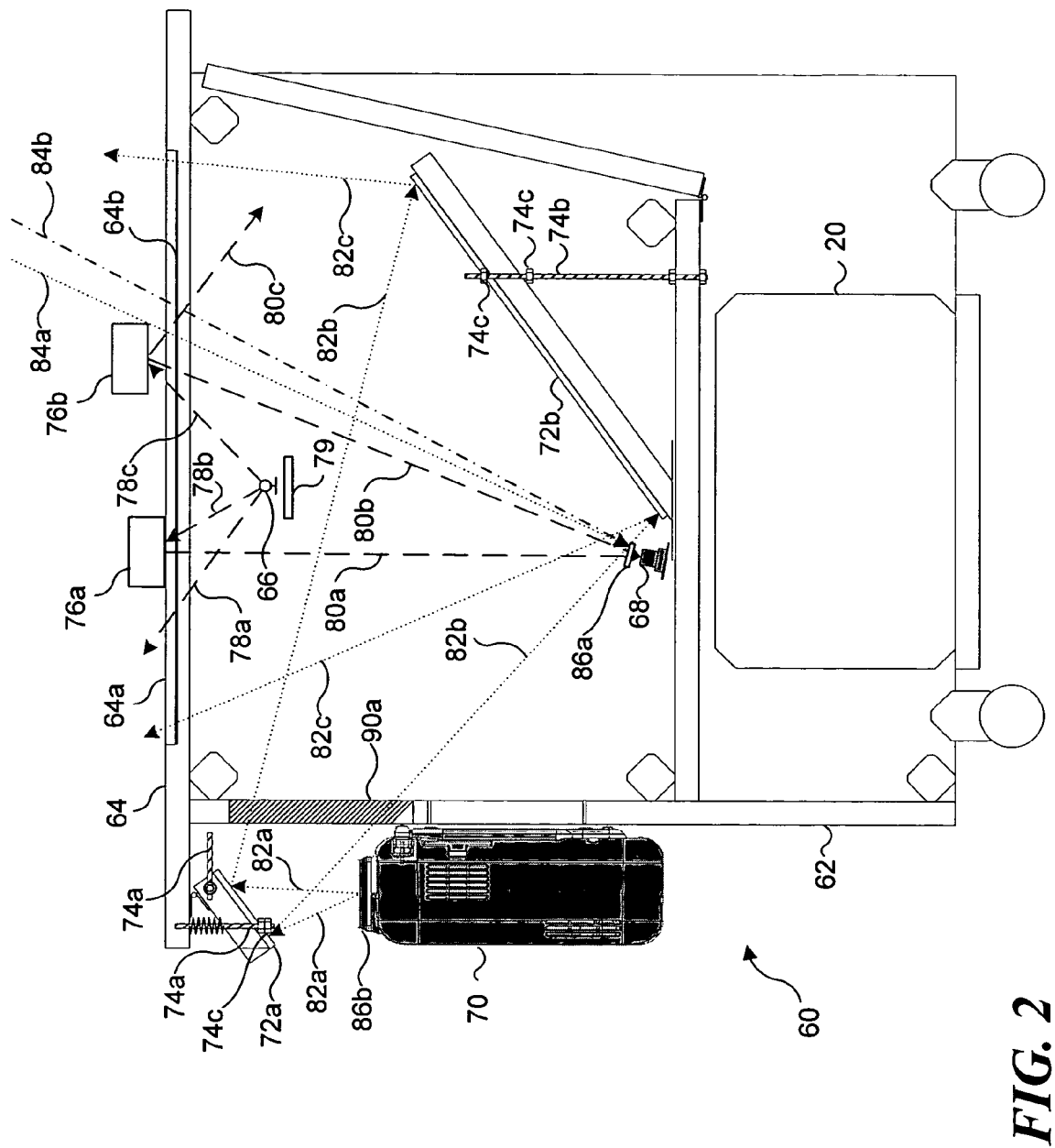
FIG. 2 is a cross sectional view of the interactive table illustrating internal components.

In FIG. 2, an exemplary interactive display table 60 is shown that includes PC 20 within a frame 62 and which serves as both an optical input and display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object positioned above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's digit) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
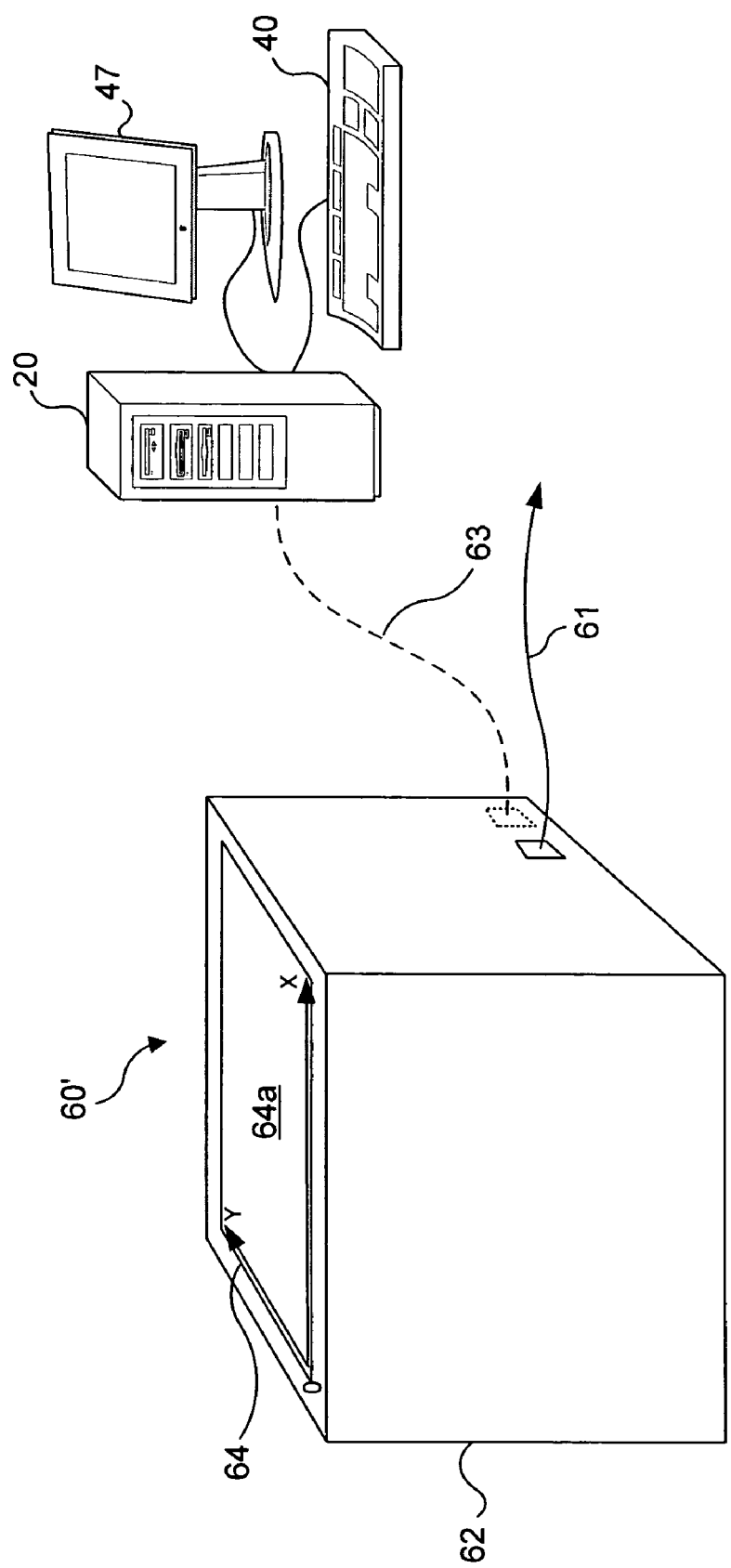
FIG. 3 is an isometric view of an embodiment of the interactive table that is coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as an object 76a, or are hovering just above it, such as an object 76b. It is the ability of the interactive display table to visually detect such objects, as well as the user's digit or other object being moved by the user that greatly facilities this rich interaction.

Again referring to FIG. 2, interactive display table 60 includes a projector 70 that is used to display graphic images, a virtual environment, or text information on display surface 64a. The projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of projector 70 to prevent IR light emitted by the projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Sources of Image Latency in Displaying Image Data in Conventional Displays

Figure 4A:
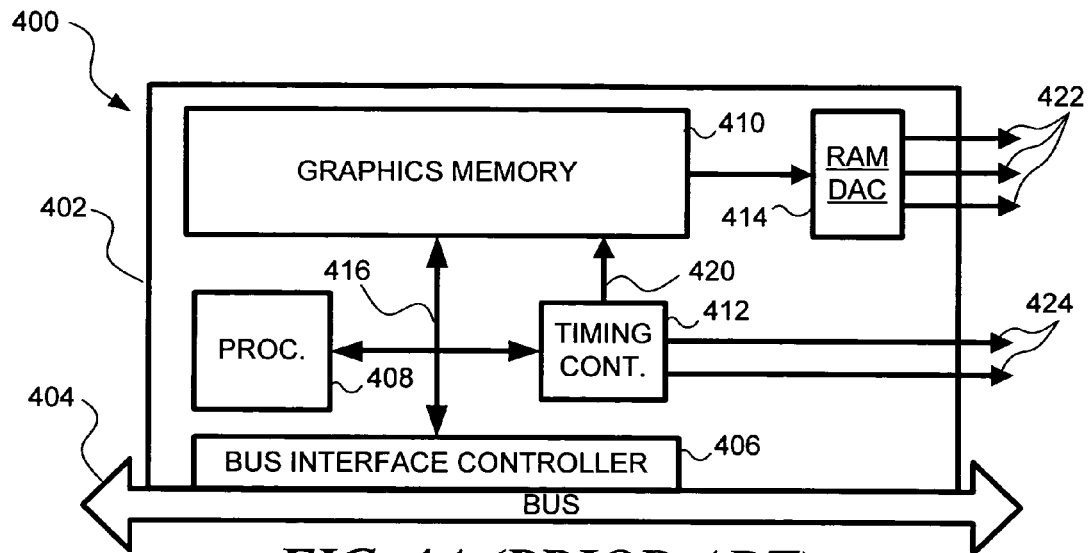
FIG. 4A (Prior Art) is a functional block diagram of an exemplary conventional graphics adapter.
Figure 4B:
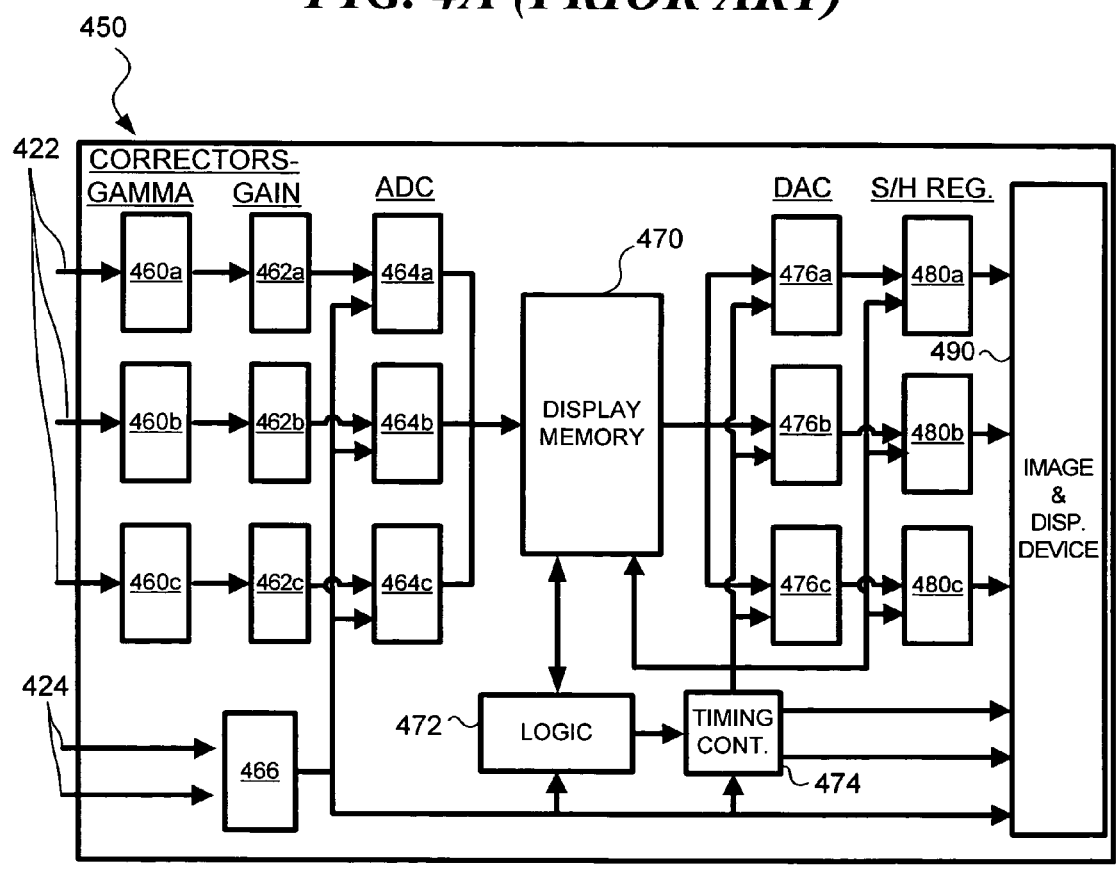
FIG. 4B (Prior Art) is a functional block diagram of an exemplary conventional multi-scanning display system.

For sake of illustrating the advantages provided by the present invention, FIG. 4A is a functional block diagram of a generally conventional graphics adapter 400, and FIG. 4B is a functional block diagram of a generally conventional display 450 receiving the output of graphics adapter 400.

Graphics adapter 400 is embodied on an adapter card 402 configured to be coupled to a peripheral bus 404, such as a peripheral component interface (PCI), PCI-Express, or accelerated graphics port (AGP) interface bus. Major components of graphics adapter 400 include a bus interface controller 406, a graphics processor 408, a graphics memory 410, a timing controller 412, and a random access memory digital-to-analog converter (RAMDAC) 414. Graphics adapter 400 receives graphics data and otherwise exchanges data via the peripheral bus 404 through bus interface controller 406. Graphics data received via the bus interface controller 406 are stored in graphics memory 410. Graphics functions delegated to graphics adapter 400 are performed by graphics processor 408 in communication with graphics memory 408. Timing controller 412 generates a pixel clock signal 420 that clocks functions of graphics adapter 400, including sequentially clocking the output of pixel attribute data from graphics memory 410, thereby causing the pixel attribute data to be provided over peripheral bus 404 by graphics adapter 400.

Pixel attribute data are stored in graphics memory 410 in digital form. For example, in a typical graphics adapter, the pixel attribute data may include 24 bits, including 8 bits each for a red component, a green component, and a blue component indicating the color depth of each component at each pixel location in the display. When output from graphics memory 410 in response to an edge of the pixel clock signal 420, the 24 bits of graphics data are passed to RAMDAC 414. RAMDAC 414 stores a lookup table of analog voltage values for each component of the pixel corresponding to the 24 bits of data received from graphics memory 410. Upon receiving the 24 bits of graphics data, RAMDAC 414 looks up the appropriate component values and generates component graphic signals 422. As shown in FIG. 4A, typically component graphics signals 422 include three color components, one for each of the red, green, and blue levels of pixels in the displayed image. A typical graphics adapter 400 makes the three component graphics signals available on three pins of a graphics output connector (not shown).

In addition to component graphics signals 422 and associated return/ground leads (not shown), graphics adapter 400 also supplies synchronization signals 424 to the display. More specifically, these synchronization signals typically include horizontal and vertical synchronization pulses that indicate to a display a start of a next line and a start of a next frame of the image, respectively. Synchronization signals 424 are generated by timing controller 412.

Component graphics signals 422 and synchronization signals 424, together with associated return/ground leads (not shown) are received by display 450. Analog component graphics signals 422 are adjusted by gamma level correctors 460a-460c. The gamma corrected analog signals are then adjusted by gain level correctors 462a-462c. The corrected analog signals are sampled and redigitized by analog-to-digital (ADC) converters 464a-464c, producing digital signals that are stored in a display memory 470.

Synchronization signals 424 are received by a timing or synchronization controller 466. Synchronization controller 466 detects and evaluates the synchronization signals to determine the resolution of the type of image that is currently being generated by graphics adapter 400. Typically, the type of image is determined by detecting parameters of the synchronization signals and finding those parameters in a look-up table. Synchronization controller 466 communicates the information to a display control logic module 472. As needed, the display control logic module rescales the image data stored in display memory 470 to rescale the image to the native resolution of display device 490.

In addition to detecting the display resolution, synchronization controller 466 uses the synchronization signals to recreate a pixel clock signal to clock pixel generation in display 450. Pixel clock signal 420 (FIG. 4A), which is used by graphics adapter 450, is of a very high frequency. Displays typically are connected to graphics adapters over interface cables of at least a few feet in length, and the high frequency pixel clock signal 420 cannot be reliably communicated over this distance. Accordingly, typical displays receive the comparatively lower frequency synchronization signals and recreate a pixel clock signal from the synchronization signals. The recreated pixel clock signal is used to clock generation of an image and display device 490.

Eventually, once the pixel clock signal has been recreated and after the pixel attribute data has been gamma corrected, gain corrected, redigitized, stored, and scaled, the image data are regenerated for display on the display device. Under direction of the display control logic and a display timing controller 474, pixel attribute data are read from display memory synchronously according to a pulse of recreated pixel clock. The digital attribute data is reconverted to analog signals by digital-to-analog (DAC) converters 476a-476c. The analog data are received and preserved by sample and hold (S/H) registers 480a-480c to preserve analog values of each of the regenerated color component signals as each pixel is generated on display device 490.

The processes undertaken in display 450 improve image quality, for example, by correcting the image gamma and gain levels. In addition, the image data are rescaled so that the image data are optimally presented on the display device 490. Thus, even in a display 450 having operational characteristics unknown to graphics adapter 400, the processing capabilities of display 450 provide an acceptable quality image.

However, in considering the processes undertaken by display 450, there is great potential for image generation delay, which can lead to latency. As described above, in typical display 450, before an image is presented on display device 490, component graphics signals 422 are gamma corrected, gain corrected, redigitized, stored, scaled, regenerated in analog form, then sampled and held for display. In many applications, this delay is not a concern. For example, as a user moves a mouse across a desktop, any latency in a corresponding pointer moving across a display screen is usually not very noticeable. The latency is usually not noticeable because of the coordination lag experienced by the user while moving the mouse with a hand across one surface, while watching the pointer move across a separate display surface. However, if the cursor is controlled by moving a physical object over the same surface on which it is displayed, as in the case of an interactive display surface, the lag becomes readily apparent.

Display System Configured to Reduce Latency in Displaying Image Data

Figure 5A:
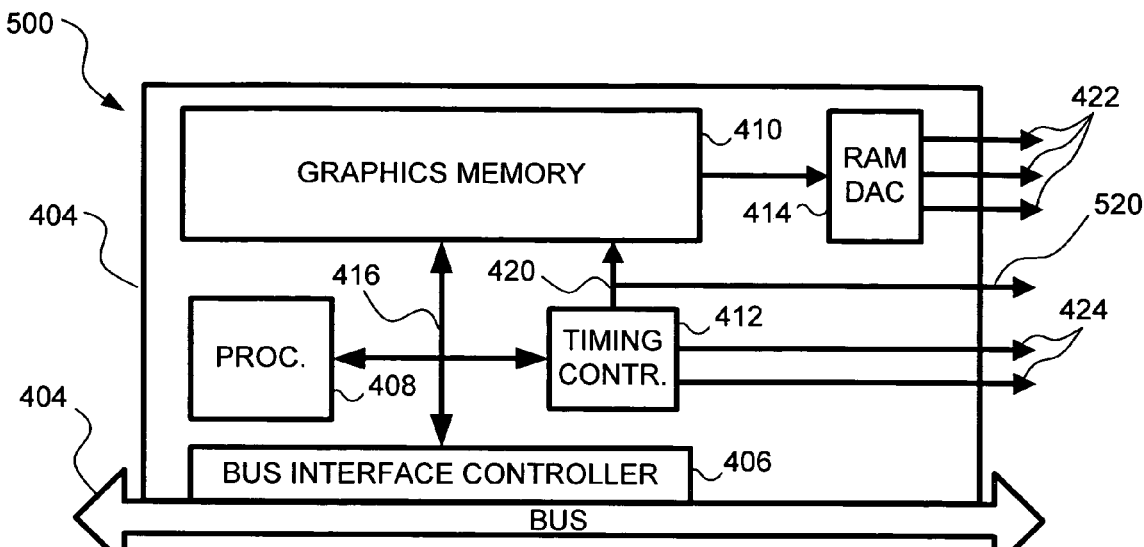
FIG. 5A is a functional block diagram of a graphics adapter adapted for use in an embodiment of the present invention.
Figure 5B:
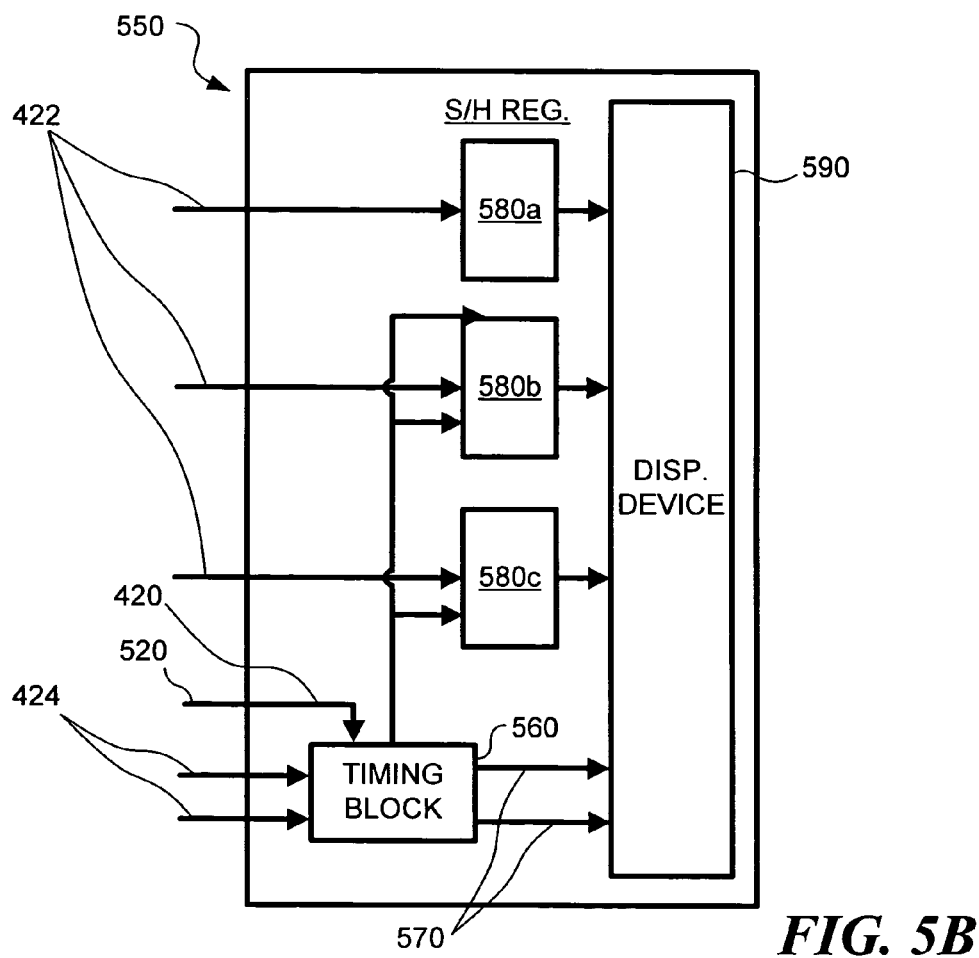
FIG. 5B is a functional block diagram of a display system in accordance with an embodiment of the present invention.

The present invention reduces a portion of the delay that may cause latency in the generation of an image responsive to an input. FIG. 5A is a functional block diagram of a graphics adapter 500 adapted for use in an embodiment of the present invention. FIG. 5B is a functional block diagram of a display system 550 in accordance with an embodiment of the present invention.

Graphics adapter 500 is nearly identical to graphics adapter 400 (FIG. 4A) with the exception that pixel clock signal 420 is communicated externally from graphics adapter 500 by a pixel clock lead 520. As previously described, in a conventional graphics adapter/display environment, the connection between the graphics adapter and the display spans a distance of at least a few feet. The high-frequency pixel clock is not reliably communicable over such a distance. Thus, the pixel clock must be recreated in the display.

However, as described in connection with FIG. 2, an interactive computing system such as interactive display table 60 using projector 70 as a display device may be closely coupled to the graphics adapter providing image data to projector 70. Thus, pixel clock signal 420 can be communicated directly from graphics adapter 500 to display 550 over lead 520. Accordingly, it is not necessary to have a synchronization controller 466 or a display timing controller 474 to recreate a clock signal in display 550.

In addition, because the display device that is used, i.e., projector 70, is integrated into interactive display table 60, the operational characteristics of the display device are known. As a result, many of the components and processes used in correcting and rescaling image data at the display 450 (FIG. 4B) are unnecessary. The computing system coupled with interactive display table 60 and projector 70 may be pre-programmed with the characteristics of projector 70 so that the image data the computing system generates can be delivered pre-corrected and scaled for presentation by the projector. Thus, devices that were necessary in display 450 may be omitted in display 550, resulting in a simplified control system that reduces potential image generation latency.

In FIG. 5B, display 550 includes only a few components. A timing block 560 receives pixel clock signal 420 over lead 520 and synchronization signals 424 from graphics adapter 500, and generates signals 570 for a display device 590. The pixel clock signals are also supplied to S/H registers 580a-580c, which preserve analog component graphics signals 422 between pulses of pixel clock signals 420 and present the preserved signals to display device 590 for display.

Logic for Reducing Latency

Figure 6:
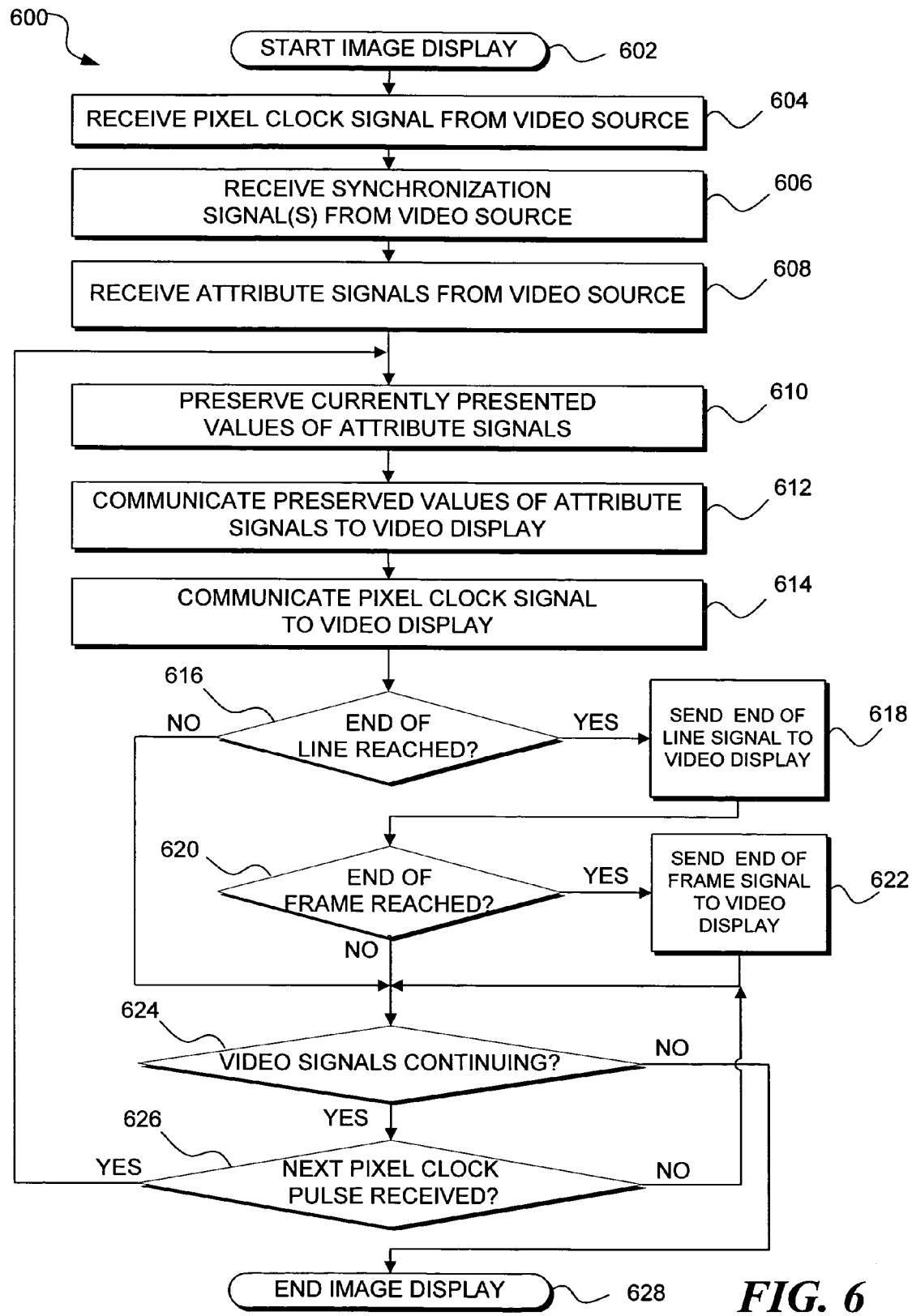
FIG. 6 is a flow diagram illustrating the logical steps for presenting image data according to an embodiment of the present invention.

FIG. 6 is an exemplary flow diagram 600 illustrating logical steps for presenting image data according to an embodiment of the present invention. Flow diagram 600 begins at a step 602. At a step 604, the pixel clock signal is received from the graphics adapter or other graphics source. At a step 606, synchronization signals, including horizontal and/or vertical synchronization signals, are received from the graphics adapter or graphics source. At a step 608, attribute signals, such as pixel component graphics signals, are received from the graphics adapter or graphics source.

At a step 610, the currently presented values of the attribute signals are preserved, by storing the values of the attribute signals in S/H registers 580a-580c, as illustrated in FIG. 5B. It will be appreciated that, if the display system accepts digital input signals, instead of using S/H registers to preserve an analog signal, a digital latch or register could be used to preserve the digital signal. The preserved values are maintained until a next pulse of the pixel clock signal causes the values of the currently presented attribute signals for a current pixel to be replaced with values of attribute signals for a next signal.

At a step 612, the preserved values are presented to the display. Also, at a step 614 the pixel clock signal received from the graphics adapter or graphics source is provided directly to the display. Again, as previously described, a pixel clock signal need not be recreated. Thus, the display can be clocked by the same pixel clock signal generated by the graphics adapter or graphics source. With the pixel clock signal and preserved attribute signals, the display can present the image data.

At a decision step 616, it is determined if an end of a display line has been reached. If so, at a step 618, an end of line signal is communicated to the display, causing the display to move to a start of a next line to generate further pixels. The end of line signal is derived from the horizontal synchronization signal. On the other hand, if it is determined at step 616 that the end of the display line has not been reached, flow diagram 600 proceeds to a step 624 to determine if graphics signals continue to be received.

If it is determined at step 616 that the end of the display line has been reached and an end of line signal has been sent at step 618, at a decision step 620, it is determined if an end of frame has been reached. If so, at a step 622, an end of frame signal is communicated to the display, causing the display to move to an origin of the displayed image (i.e., the upper left corner) to generate further pixels at a start of a new frame. On the other hand, if it is determined at step 616 that the end of the display line has not been reached, flow diagram 600 proceeds to step 624 to determine if graphics signals continue to be received.

At decision step 624, if graphics signals are not continuing to be received, flow diagram 600 proceeds to a step 628, where the display of images ends. On the other hand, if it is determined at decision step 624 that the graphics signals are continuing to be received, at a decision step 626, it is determined if a next pulse of the pixel clock signal has been received. If not, flow diagram 626 loops to decision step 624 to determine if the graphics signals are continuing to be received. On the other hand, if it is determined that a next pixel clock pulse has been received, the flow diagram loops to step 610 to preserve values of a next set of currently presented attribute signals for the next pixel.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A system for reducing a processing delay of a graphics display that presents a graphics image in response to graphics image data received from a graphics source, comprising:
   (a) a pixel clock signal input configured to receive a pixel clock signal from the graphics source, each of a series of pulses comprising the pixel clock signal indicating a transition to a next pixel in the graphics image data;
   (b) a pixel input configured to receive a plurality of attribute signals from the graphics source, each of the attribute signals representing a desired visual attribute of a pixel;
   (c) a synchronization input configured to receive a plurality of synchronization signals from the graphics source, each of the synchronization signals representing a transition to a next portion of the graphics image data;
   (d) a capture buffer configured to receive the pixel clock signal from the pixel clock signal input and to receive the attribute signals from the pixel input, the capture buffer being further configured, upon receiving each pulse of the pixel clock signal, to preserve values of the attribute signals just currently being received, until receiving a next pulse of the pixel clock signal;

(e) a pixel clock output configured to receive the pixel clock signal from the pixel clock signal input and to communicate the pixel clock signal to the graphics display, to indicate a transition to a next pixel;

(f) a pixel output configured to receive the values of the attribute signals preserved by the capture buffer and to communicate the values of the attribute signals to the graphics display; and (g) a synchronization output configured to receive the synchronization signals from the synchronization input and provide position signals to the graphics display, the position signals communicating a transition to a next pixel position on the graphics display corresponding to a next portion of the graphics image.

2. The system of claim 1, wherein the pixel clock signal received by the pixel clock signal input includes a graphics source pixel clock signal, the graphics source pixel clock signal being used at the graphics source, to cause the graphics source to generate the plurality of attribute signals from a next set of pixel attributes stored in a memory of the graphics source.

3. The system of claim 1, wherein the plurality of attribute signals received from the graphics source includes a plurality of color component signals, each of the color component signals indicating a level of a different color content for presenting the pixel in the graphics image on the graphics display.

4. The system of claim 3, wherein the plurality of color component signals includes a red component signal, a green component signal, and a blue component signal.

5. The system of claim 1, wherein the plurality of synchronization signals received from the graphics source include at least one of a horizontal synchronization signal, and a vertical synchronization signal, the horizontal synchronization signal being configured to signal a transition to a next line of the graphics image, the vertical synchronization signal being configured to signal a transition to a next frame of the graphics image data.

6. The system of claim 5, wherein the synchronization output includes at least one of an end of line signal and an end of frame signal, the end of line signal signifying a transition to a next line on the graphics display corresponding to the transition to the next line of the graphics image included in the horizontal synchronization signal, and the end of frame signal signifying a transition to an origination point on the graphics display corresponding to the transition to the next frame of the graphics image data.

7. The system of claim 1, wherein each of the plurality of attribute signals includes an analog signal, and wherein the capture buffer includes a sample and hold circuit.

8. The system of claim 1, wherein each of the plurality of attribute signals includes a digital signal, and wherein the capture buffer includes a latch, the latch being configured to preserve a maximum expected number of data bits provided in the digital signal.

9. The system of claim 1, wherein the values of the attribute signals preserved by the capture buffer and communicated to the graphics display maintain at least one of a same gain level and a same gamma level as the plurality of attribute signals received from the graphics source.

10. The system of claim 1, wherein the synchronization output includes at least one of an end of line signal and an end of frame signal.

11. The system of claim 1, wherein the graphics source includes a video graphics array adapter.

12. The system of claim 1, wherein the graphics display is configured to present the graphics image data on the graphics display at a same resolution as the graphics image data received from the graphics source.

13. The system of claim 1, wherein the graphics display includes a digital projector.

14. A system for reducing a processing delay of a graphics display that presents a graphics image in response to graphics image data received from a graphics source, comprising:

(a) a pixel clock signal input configured to receive a pixel clock signal from the graphics source, each of a series of pulses comprising the pixel clock signal indicating a transition to a next pixel in a line of the graphics image and causing the graphics source to generate a plurality of color component signals from a next set of pixel attributes stored in a memory of the graphics source;

(b) a pixel input configured to receive the plurality of color component signals, each of the plurality of color component signals representing a desired level of a different color in the pixel signals received from the graphics source;

(c) a synchronization input configured to receive a horizontal synchronization signal, the horizontal synchronization signal being configured to indicate a transition to a next line of the graphics image, and a vertical synchronization signal, the vertical synchronization signal being configured to indicate a transition to a next frame of the graphics image data;

(d) a capture buffer configured to receive the pixel clock signal from the pixel clock signal input and to receive the color component signals from the pixel input, the capture buffer being further configured, upon receiving each pulse of the pixel clock signal, to preserve values of the color component signals currently being received, until receiving a next pulse of the pixel clock signal;

(e) a pixel clock output configured to receive the pixel clock signal from the pixel clock signal input and to communicate the pixel clock signal to the graphics display to indicate a transition to a next pixel of the graphics image;

(f) a pixel output configured to receive the values of the color component signals preserved by the capture buffer and to communicate the values of the color component signals to the graphics display; and (g) a synchronization output configured to receive the horizontal synchronization signal and to generate a corresponding end of line signal signifying a transition to a next line of the graphics image, and further configured to receive the vertical synchronization signal from the synchronization input and generate a corresponding end of frame signal signifying a transition to an origination point on the graphics display corresponding to the transition to the next frame of the graphics image data, the synchronization output being further configured to generate the end of line signal and the end of frame signal to preserve the scaling of the graphics image data received from the graphics source.

15. The system of claim 14, wherein the plurality of color component signals includes a red component signal, a green component signal, and a blue component signal.

16. The system of claim 14, wherein each of the plurality of attribute signals includes an analog signal, and wherein the capture buffer includes a sample and hold circuit.

17. The system of claim 14, wherein each of the plurality of attribute signals includes a digital signal, and wherein the capture buffer includes a latch, the latch being configured to preserve a maximum expected number of data bits provided in the digital signal.

18. The system of claim 14, wherein the values of the color component signals preserved by the capture buffer and communicated to the graphics display maintain at least one of a same gain level and a same gamma level as the plurality of color component signals received from the graphics source.

19. The system of claim 14, wherein the graphics source includes a video graphics array adapter.

20. The system of claim 14, wherein the graphics display includes a digital projector.

21. A system for generating a graphics image presented on a display in response to user interaction with the display, without causing an excessive latency in the response, comprising:
   (a) an interactive display including:
      (i) a projector;
      (ii) a display surface that diffuses light and on which an image can be displayed by the projector, said display surface having a processing side and an interactive side, the processing side being opposite to the interactive side from which the image is viewed and adjacent to which physical objects can be placed;
      (iii) a light source disposed on the processing side of the display surface, the light source emitting infrared light that is transmitted through the display surface to the interactive side; and
      (iv) a light sensor disposed on the processing side of the display surface, the light sensor sensing infrared light reflected back from a physical object that is adjacent to the processing side of the display surface through the display surface;
   (b) a processor in communication with the light sensor;
   (c) a memory in communication with the processor, the memory storing data and machine instructions that cause the processor to carry out a plurality of functions;
   (d) a graphics adapter in communication with the processor and configured to generate graphics image data the define lines of a graphics image to be projected by the projector onto the display surface; and
   (e) a projector control system in communication with the graphics adaptor, for controlling the projector to display the graphics image data generated by the graphics adapter, the projector control system comprising:
      (i) a pixel clock signal input configured to receive a pixel clock signal from the graphics adapter, each of a series of pulses of the pixel clock signal indicating a transition to a next pixel in a line of the graphics image;
      (ii) a pixel input configured to receive a plurality of attribute signals from the graphics adapter, each of the attribute signals representing a desired visual attribute of a pixel;
      (iii) a synchronization input configured to receive a plurality of synchronization signals from the graphics adapter, each of the synchronization signals representing a transition to a next portion of the graphics image data;
      (iv) a capture buffer configured to receive the pixel clock signal from the pixel clock signal input and to receive the attribute signals from the pixel input, the capture buffer being further configured, upon receiving each pulse of the pixel clock signal, to preserve values of the attribute signals currently being received, until receiving a next pulse of the pixel clock signal;
      (v) a pixel clock output configured to receive the pixel clock signal from the pixel clock signal input and to communicate the pixel clock signal to the projector;
      (vi) a pixel output configured to receive the values of the attribute signals preserved by the capture buffer and to communicate the values of the attribute signals to the projector; and
      (vii) a synchronization output configured to receive the synchronization signals from the synchronization input and to provide position signals to the projector, the position signals communicating a transition to a next position on the display surface corresponding to a next portion of the graphics image data.

22. The system of claim 21, wherein the pixel clock signal received by the pixel clock signal input includes a graphics adapter pixel clock signal, the graphics adapter pixel clock signal causing the graphics adapter to generate the plurality of attribute signals from a next set of pixel attributes stored in a memory of the graphics adapter.

23. The system of claim 21, wherein the plurality of attribute signals received from the graphics adapter includes a plurality of color component signals, each of the color component signals representing a desired level for a different color content of the pixel.

24. The system of claim 23, wherein the plurality of color component signals includes a red component signal, a green component signal, and a blue component signal.

25. The system of claim 21, wherein the plurality of synchronization signals received from the graphics adapter includes at least one of a horizontal synchronization signal, and a vertical synchronization signal, the horizontal synchronization signal being configured to signal a transition to a next line of the graphics image, and the vertical synchronization signal being configured to signal a transition to a next frame of the graphics image data.

26. The system of claim 21, wherein the synchronization output includes at least one of an end of line signal, and an end of frame signal, the end of line signal signifying a transition to a next line of the graphics image in the graphics image data and being included in the horizontal synchronization signal, and the end of frame signal signifying a transition to an origination point on the display surface corresponding to the transition to the next frame of the graphics image data.

27. The system of claim 21, wherein each of the plurality of attribute signals includes an analog signal, and wherein the capture buffer includes a sample and hold circuit.

28. The system of claim 21, wherein each of the plurality of attribute signals includes a digital signal, and wherein the capture buffer includes a latch, the latch being configured to preserve a maximum expected number of data bits provided in the digital signal.

29. The system of claim 21, wherein the values of the attribute signals preserved by the capture buffer and communicated to the projector maintain at least one of a same gain level and a same gamma level as the plurality of attribute signals received from the graphics source.

30. The system of claim 21, wherein the synchronization output includes at least one of an end of line signal and an end of frame signal.

31. The system of claim 21, wherein the graphics adapter comprises a video graphics array adapter.

32. The system of claim 21, wherein the projector is configured to present the graphics image on the display surface at a same resolution as the graphics image data received from the graphics adapter.

33. The system of claim 21, wherein the projector comprises one of a liquid crystal display device, a digital light processor device, and a liquid crystal on silicon device.

34. A method for reducing latency in presenting a graphics image on a graphics display, said graphics image corresponding to graphics image data received from a graphics source, comprising the steps of:
  (a) receiving a pixel clock signal from the graphics source, each of a series of pulses of the pixel clock signal indicating a transition to a next pixel in a line of the graphics image;
  (b) receiving a plurality of attribute signals from the graphics source, each of the attribute signals representing a desired visual attribute of a pixel;
  (c) receiving a plurality of synchronization signals from the graphics source, each of the synchronization signals representing a transition to a next portion of the graphics image data;
  (d) preserving values of the attribute signals currently being received upon receiving each pulse of the pixel clock signal, until receiving a next pulse of the pixel clock signal;
  (e) communicating the pixel clock signal to the graphics display to indicate a transition to a next pixel in a line of the graphics image;
  (f) communicating the values of the attribute signals to the graphics display; and
  (g) generating a plurality of position signals conveyed to the graphics display, the position signals corresponding to the synchronization signals and communicating a transition to a next position of the graphics display corresponding to a next portion of the graphics image data.

35. The method of claim 34, wherein the pixel clock signal received from the graphics source includes the graphics source pixel clock signal, the graphics source pixel clock signal causing the graphics source to generate the plurality of attribute signals from a next set of pixel attributes stored in a memory of the graphics source.

36. The method of claim 34, wherein the plurality of attribute signals received from the graphics source includes a plurality of color component signals, each of the color component signals representing a desired level for a different color content of the pixel.

37. The method of claim 36, wherein the plurality of color component signals includes a red component signal, a green component signal, and a blue component signal.

38. The method of claim 34, wherein the plurality of synchronization signals received from the graphics source include at least one of a horizontal synchronization signal, the horizontal synchronization signal being configured to signal a transition to a next line of the graphics image data, and a vertical synchronization signal, the vertical synchronization signal being configured to signal a transition to a next frame of the graphics image data.

39. The method of claim 34, wherein the synchronization output includes at least one of an end of line signal, and an end of frame signal, the end of line signal signifying a transition to a next line of the graphics image corresponding to the transition to the next line of the graphics image data included in the horizontal synchronization signal, the end of frame signal signifying a transition to an origination point on the graphics display corresponding to the transition to the next frame of the graphics image data.

40. The method of claim 34, wherein each of the plurality of attribute signals includes an analog signal, and wherein the capture buffer includes a sample and hold circuit.

41. The method of claim 34, wherein each of the plurality of attribute signals includes a digital signal, and wherein the capture buffer includes a latch, the latch being configured to preserve a maximum expected number of data bits provided in the digital signal.

42. The method of claim 34, wherein the values of the attribute signals preserved by the capture buffer and communicated to the graphics display maintain at least one of a same gain level and a same gamma level, as the plurality of attribute signals received from the graphics source.

43. The method of claim 34, wherein the synchronization output includes at least one of an end of line signal and an end of frame signal.

44. The method of claim 34, wherein the graphics source includes a video graphics array adapter.

45. The method of claim 34, wherein the graphics display is configured to present the graphics image data at a same resolution as the graphics image data received from the graphics source.

46. The method of claim 34, wherein the graphics display comprises a projector.

47. A method for directing a graphics display to present graphics images corresponding to graphics image data received from a graphics source, so as to reduce a processing delay in presenting the graphics images on the graphics display, comprising the steps of:
  (a) receiving a pixel clock signal from the graphics source, each of a series of pulses of the pixel clock signal indicating a transition to a next pixel in a line of the graphics image and causing the graphics source to generate a plurality of color component signals from a next set of pixel attributes stored in a memory of the graphics source;
  (b) receiving the plurality of color component signals, each of the color component signals representing a desired constituent color content of the pixel signals from the graphics source;
  (c) receiving a horizontal synchronization signal, the horizontal synchronization signal being configured to signal a transition to a next line of the graphics image;
  (d) receiving a vertical synchronization signal, the vertical synchronization signal being configured to signal a transition to a next frame of the graphics image data;
  (e) preserving values of the color component signals currently being received upon receiving each pulse of the pixel clock signal, until receiving a next pulse of the pixel clock signal;
  (f) communicating the pixel clock signal to the graphics display;
  (g) communicating the values of the color component signals to the graphics display;
  (h) generating an end of line signal corresponding to the horizontal synchronization signal, the end of line signal signifying a transition to a next line of the graphics image;
  (i) generating an end of frame signal corresponding to the vertical synchronization signal, the end of frame signal signifying a transition to an origination point on the graphics display; and
  (j) presenting the graphics image on the graphics display, wherein a resolution of the graphics display is the same as that of the graphics image data received from the graphics source.

48. The method of claim 47, wherein the plurality of color component signals includes a red component signal, a green component signal, and a blue component signal.

49. The method of claim 47, wherein each of the plurality of attribute signals includes an analog signal, and wherein the capture buffer includes a sample and hold circuit.

50. The method of claim 47, wherein each of the plurality of attribute signals includes a digital signal, and wherein the capture buffer includes a latch, the latch being configured to preserve a maximum expected number of data bits provided in the digital signal.

51. The method of claim 47, wherein the values of the color component signals preserved by the capture buffer and communicated to the graphics display maintain at least one of a same gain level and a same gamma level as the plurality of color component signals received from the graphics source.

52. The method of claim 47, wherein the graphics source includes a video graphics array adapter.

53. The method of claim 47, wherein the graphics display comprises an image projector.

* * * * *